United States Patent
Salin et al.

(10) Patent No.: US 7,843,975 B2
(45) Date of Patent: Nov. 30, 2010

(54) HIGH-POWER FIBER OPTIC PULSED LASER DEVICE

(75) Inventors: Francois Salin, Gradigan (FR); Philippe Metivier, Corenc (FR)

(73) Assignee: Eolite Systems, Pessac (FR)

( * ) Notice: Subject to any disclaimer, the term of this patent is extended or adjusted under 35 U.S.C. 154(b) by 36 days.

(21) Appl. No.: 12/301,106

(22) PCT Filed: May 15, 2007

(86) PCT No.: PCT/FR2007/051272

§ 371 (c)(1),
(2), (4) Date: Nov. 17, 2008

(87) PCT Pub. No.: WO2007/132124

PCT Pub. Date: Nov. 22, 2007

(65) Prior Publication Data

US 2009/0168815 A1     Jul. 2, 2009

(30) Foreign Application Priority Data

May 17, 2006   (FR)   .................................. 06 51797

(51) Int. Cl.
*H01S 3/30*     (2006.01)
(52) U.S. Cl. ................. 372/6; 372/12; 372/13; 372/23; 372/70
(58) Field of Classification Search ............... 372/6, 372/10–13, 18, 23, 70–72, 92–102
See application file for complete search history.

(56) References Cited

U.S. PATENT DOCUMENTS 5,867,305 A * 2/1999 Waarts et al. .......... 359/337.12
5,909,306 A * 6/1999 Goldberg et al. ......... 359/337.1
6,014,249 A    1/2000 Fermann
6,137,812 A    10/2000 Hsu et al.
2002/0009106 A1* 1/2002 Miyokawa et al. ............ 372/36
2004/0213302 A1* 10/2004 Fermann et al. ................ 372/6

FOREIGN PATENT DOCUMENTS

WO     WO 02/084821     10/2002

OTHER PUBLICATIONS

Ball, G.A. et al., "Narrow-Linewidth Fiber Laser with Integrated Master Oscillator-Power Amplifier", Proceedings of the Optical Fiber Communication Conference, Feb. 2-7,1992, New York, IEEE, vol. CONF 15, Feb. 2, 1992, p. 97, XP000341615.

* cited by examiner

*Primary Examiner*—Minsun Harvey
*Assistant Examiner*—Xnning Niu
(74) *Attorney, Agent, or Firm*—Young & Thompson

(57) ABSTRACT

The invention relates to a high-power fiberoptic laser device comprising at least one laser diode (1) capable of transmitting a pump wave, a triggered optical resonator (22) consisting of a first double-sheathed optical fiber (6), an optical amplifier consisting of a second double-sheathed optical fiber (10), first (33) and second (35) optical coupling means capable of coupling said pump wave onto at least one of the two optical fibers (6) and (10). According to the invention, at least one of the two fibers has a configuration according to which the pump wave coupled to this optical fiber (6) or (10) is partially absorbed, generating a residual pump wave which is coupled to the other optical fiber (6) or (10) by second optical coupling means, and said second optical fiber (10) has a length greater than that of the first optical fiber (6).

11 Claims, 4 Drawing Sheets

HIGH-POWER FIBER OPTIC PULSED LASER DEVICE

The invention relates to a high-power fiber optic pulsed laser device.

The principle of producing short laser pulses by triggering of a continuous pumped laser is long-time known. It consists in storing energy in a laser medium placed in an optical resonator kept in off-state.

To obtain the highest possible efficiency (ratio between the pump power and the power emitted by the laser), it is necessary to use a laser medium having a length that enables a great part of the pump power to be absorbed.

After a pumping duration corresponding to the duration between two successive laser pulse emissions, the resonator state is then suddenly switched to on-state and a laser flow can be established in the cavity.

As the gain per pass is high, the intensity can quickly increase. After a small number of round trips, the radiation reaches a maximal value and progressively decreases. The laser emission then takes the form of a pulse having a duration that depends on many parameters.

In particular, it is known (A. E. Siegman: Lasers (University Science Books, Sausalito, Calif., 1986)) that the laser pulse-duration directly depends on the cavity length and on the gain per pass.

Laser pulses of sub-nanosecond duration have been obtained with crystal laser mediums the length of which is smaller than 1 mm. Very strongly doped crystals must then be used to absorb a great part of the pump wave emitted by a laser diode and to obtain non negligible efficiencies and moderate energies per pulse.

The average power that can be produced with such laser devices is nevertheless limited by the thermal effects induced in the laser medium.

A classical solution consists in adding, after the pulse-generating laser device, an amplifier not having the same length constraints and being able to amplify short pulses even if the amplifier length is long. This solution, called MOPA ("Master Oscillator Power Amplifier"), is inevitably more complex and necessitates two separate pumping sources.

This solution has been used by many authors, in particular with association of solid microlasers producing low-power laser pulses with fiber amplifiers providing a strong gain and a high average power.

Nevertheless, this solution has the disadvantage to be complex because several amplification stages are necessary to reach powers compatible with industrial applications.

Further, it is impossible to integrate this system because the microlaser cannot be welded to the rest of the amplifiers.

In the same way, the oscillator can be a pulsed laser diode but the number of amplification stages still increases.

Otherwise, it is necessary to isolate these amplification stages from each other, or else a great part of the power would be emitted in the form of a continuous radiation.

Recently, a new technique of producing nanosecond pulses, based uniquely on optical fibers doped with Ytterbium ions, has been presented in Limpert et al. (Advanced Solid State Photonics Conference, Vienna, February 2005). This technique is based on using as an amplifying medium a very strongly doped short optical fiber.

It has also been shown that such a system enables production of pulses with durations of the order of 10 ns, including with variable attenuators (or optical modulators (Q-switch)) having a rising time much longer than 10 ns.

It is known that the pulses duration is proportional to the length of the optical resonator producing them. To obtain short pulses, short resonators must thus be used. That imposes short optical fiber lengths in the resonator, therefore a low pump-power absorption, and thus a poor efficiency.

To increase the efficiency while keeping a short fiber length, the absorption coefficient of the pump in the structure is usually increased, thus introducing very high excited-population densities, which lead to a reduction of the optical fiber service life.

The classical solutions thus impose a compromise between a short fiber (short pulse-duration) and longevity (too high excited-ion density liable to introduce an evolution of the fiber).

Thus, it is difficult to obtain simultaneously high efficiency, short pulse-duration and great longevity of the fiber.

The object of the invention is thus to provide a high-power fiber optic laser device having a high efficiency, a short pulse-duration of the order of the nanosecond or of a few nanoseconds (<10 ns), a great optical fiber longevity, that is of simple design and that can be in a partially- or fully-integrated form.

To that end, the invention relates to a high-power fiber optic pulsed laser device comprising:
  at least one laser diode suitable for emitting a pump wave,
  a triggered optical resonator suitable for generating a laser wave, comprising:
    a very strongly reflective end and a partially reflective end suitable for partially transmitting the pump wave and the laser wave outside of the triggered optical resonator,
    an amplifying medium consisting of a first optical fiber suitable for absorbing the pump wave and for amplifying the laser wave, disposed between the two reflective ends,
    an optical modulator suitable for triggering from an off-state to a on-state,
  an optical amplifier consisting of a second optical fiber, disposed such that the partially reflective end of the triggered optical resonator is located between the two optical fibers, said first and second optical fibers being of the double-sheathed optical fiber type with a core, a pumping sheath and a confining sheath, and having each an inner end and an outer end, the two inner ends being opposite to each other,
  first optical coupling means suitable for coupling said pump wave to one of the two optical fibers through the outer end thereof,
  second optical coupling means disposed between the two optical fibers, suitable for coupling said pump wave onto one of the two optical fibers through the inner end thereof,
  According to the invention:
  the optical modulator is an acousto-optic modulator or an electro-optic modulator,
  the doped core of the optical fiber through the outer end of which said pump wave is coupled is suitable for partially absorbing the pump wave and for leaving a residual pump wave at the inner end of said optical fiber,
  the second optical coupling means are suitable for providing simultaneously the coupling of the residual pump wave and the coupling of the laser wave emerging from the triggered optical resonator, to the inner end of the other of the two optical fibers,
  said second optical fiber has a length greater than that of the first optical fiber, which makes it suitable for amplifying the laser wave emerging from the triggered optical resonator.

In different possible embodiments, the present invention also relates to the following features, which can be taken individually or according to any technically possible combination thereof and each offer specific advantages:
- the inner ends of the first and second optical fibers, the partially reflective end and the second optical coupling means are assembled together so as to form a monolithic assembly,
- the first and second optical fibers are made of a single optical fiber in which the partially reflective end and the second optical coupling means are etched or photoengraved, forming two separate optical fiber parts with different lengths,
- the partially reflective end and the optical modulator form an integrated modulator in the optical fibers, comprising an electrical control so as to control the reflectivity of said modulator, said integrated modulator being disposed between the first and second optical fibers,
- the partially reflective end comprises a Bragg grating,
- the strongly reflective end and the first optical coupling means form a total reflector integrated to the outer end of the first optical fiber, said total reflector comprising a Bragg grating,
- the second optical coupling means are mechanical optical-fiber-end fastening means suitable for bringing closer the opposite inner ends of the two optical fibers,
- the fiber optic pulsed laser device comprises:
  - two laser diodes each emitting a pump wave, and
  - two first optical coupling means, one of the first optical coupling means being suitable for coupling one of the pump waves to the outer end of the first optical fiber and the other of the first optical coupling means being suitable for coupling the other pump wave to the outer end of the second optical fiber,
- at least one of the two optical fibers (6, 10) is of the photonic fiber type,
- the cores of the first and second optical fibers have a diameter larger than 30 μm,
- the fiber optic pulsed laser device comprises a polarizing means and a stabilizing means to stiffen the optical fibers so as to obtain polarized laser pulses.

The invention will be more fully described with reference to the appended drawings, in which.

Figure 1:
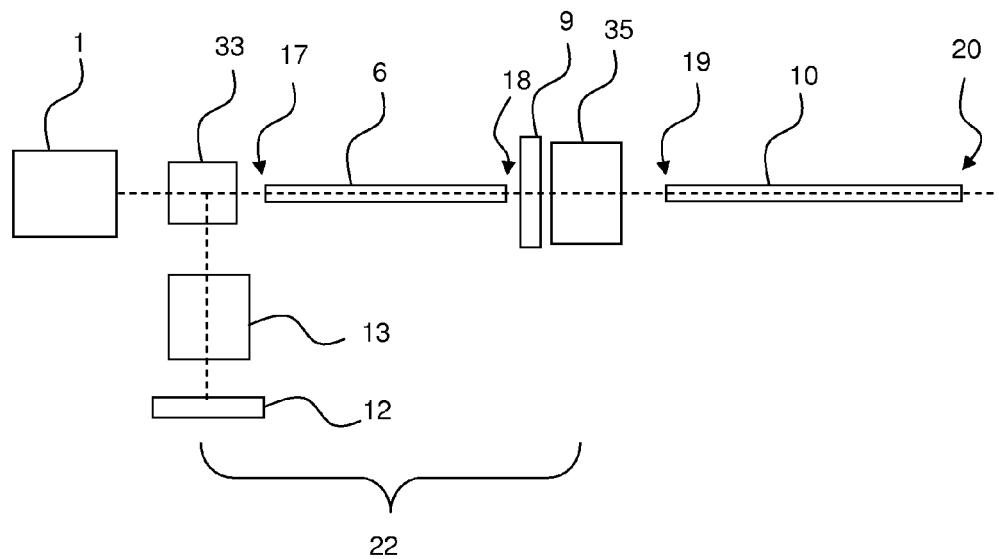
FIG. 1 shows a high-power fiber optic laser device according to an embodiment of the invention.

The device comprises a laser diode 1 suitable for emitting a pump wave. It comprises several laser diodes 1.

The pump wave is injected into a triggered optical resonator 22 suitable for generating a laser wave.

Triggered optical resonator 22 comprises a very strongly reflective end 12, that is fully or quasi-fully reflective, and a partially reflective end 9 suitable for partially transmitting the pump wave and the laser wave outside of triggered optical resonator 22.

It comprises an amplifying medium consisting of a first optical fiber 6 suitable for partially absorbing the pump wave and for amplifying the laser wave, disposed between the two reflective ends 9 and 12.

It can advantageously comprise an optical modulator 13 suitable for switching from an off-state to an on-state to obtain laser pulses.

In a classical manner, optical modulator 13 can be for example an acousto-optic or an electro-optic modulator.

It comprises an optical amplifier consisting of a second optical fiber 10, disposed outside of triggered optical resonator 22.

The partially reflective end 9 is disposed between the first 6 and second 10 optical fibers each having an inner end 18, 19 and an outer end 17, 20. The two inner ends (18, 19) are disposed opposite to each other.

Outer end 17 of first optical fiber 6 is suitable for receiving a pump wave emitted by a laser diode 1 through first optical coupling means 33. Outer end 17 of first optical fiber 6 and outer end 20 of second optical fiber 10 are separated by the two optical fibers 6 and 10.

Figure 2:
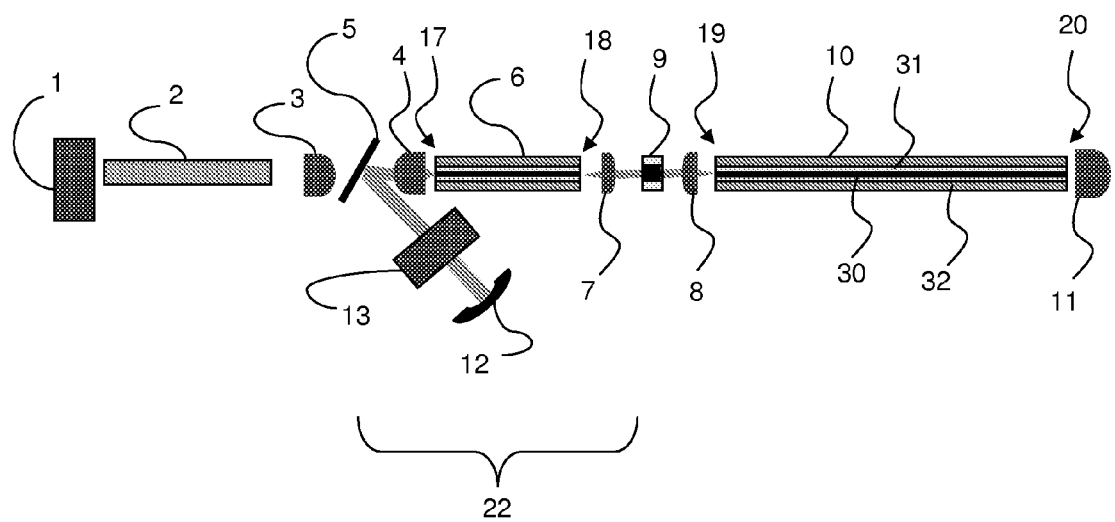
FIG. 2 shows in more details the above fiber optic laser device.

First optical coupling means 33 can comprise a first lens 3, a dichroic mirror 5 and a second lens 4, as shown in FIG. 2.

Partially-reflective end 9 is partially reflective at the laser wavelength.

It must be suitable for transferring the laser and pump waves going through it. It can consist of a simple air, glass or silica plate or a plate treated with dielectric layers or a semi-reflective mirror or a bulk Bragg grating engraved into a substrate of glass or of any other reflective system.

Partially-reflective end 9 circumscribes, on the first optical fiber 6 side, a first "oscillator" area in which the laser wave will build-up.

On the second optical fiber 10 side, partially reflective end 9 circumscribes an "amplifying" area in which the laser wave will be amplified.

The fiber laser device can comprise second optical coupling means 35 disposed between the two optical fibers 6 and 10.

As shown in FIG. 2, first 6 and second 10 optical fibers are of the double-sheathed optical fiber type with a core 30, a pumping sheath 31 and a confining sheath 32.

Doped core 30 of optical fiber 6 through the outer end 17 of which the pump wave is coupled is suitable for partially absorbing the pump wave and for leaving a residual pump wave at inner end 18 of the other optical fiber 6.

Inner end 18 of first optical fiber 6 and inner end 19 of second optical fiber 10 are suitable for transmitting to each other simultaneously the residual pump wave and the laser wave emerging from resonator 22 through second optical coupling means 35.

Second optical coupling means 35 are optimized to couple simultaneously the residual pump wave emerging from pumping sheath 31 of optical fiber 6 toward pumping sheath 31 of the other optical fiber 10 and the laser wave emerging from core 30 of optical fiber 6 in doped core 30 of the other optical fiber 10.

Second optical coupling means 35 can comprise a first collimation lens 7 disposed between first optical fiber 6 and partially reflective end 9 and a second collimation lens 8 disposed between partially reflective end 9 and second optical fiber 10.

Partially-reflective end 9 can be located between first collimation lens 7 and second collimation lens 8 or between one of the inner ends 18, 19 of fibers 6, 10 and one of these two optical elements 7, 8.

Optical fibers 6 and 10 are composite laser fibers suitable for producing gain at the laser wavelength of interest.

Core 30 of these optical fibers 6 and 10 has a diameter between 5 and 200 micrometers. It is doped with an ion chosen in the rare earth family (Ytterbium, Neodymium, Erbium, Thulium, Holmium ... ). Preferentially, it doped with Ytterbium ions. It enables a wave to be guided at the laser wavelength.

This waveguide is preferentially single mode but can be multimode.

Core 30 of optical fibers 6 and 10 is surrounded by a pumping sheath 31 the diameter of which is between 1 and 10 times that of core 30.

Pumping sheath 31 can be homogeneous or contain microstructures so as to ensure guiding of the laser wave in core 30. Optical fibers 6 and 10 are then of the photonic fiber type.

Pumping sheath 31 is surrounded by a confining sheath 32 made of a low index material or a structure of the "air-clad" type. Pumping sheath 31 has to provide waveguide at the pump wavelength corresponding to an absorption of the ion that dopes core 30.

The numerical aperture of this pumping sheath 31 has to be the greatest possible.

The assembly can be surrounded by a mechanical sheath which function is to provide a mechanical holding for the fibers.

Optical fibers 6 and 10 are preferentially made of glass or silica and air.

Optical fibers 6 and 10 can have different core and sheath diameters but the system will function advantageously if the ratios between core diameter and sheath diameter are very close in first optical fiber 6 and second optical fiber 10.

Pump waves are incident on outer end 17 of first optical fiber 6. They also can be injected along this first optical fiber 6, into pumping sheath 31, through first optical coupling means 33.

FIG. 2 shows in more details an embodiment of the fiber laser device, enabling a better understanding of the device operation.

A pump wave is emitted by laser diode 1. It is injected into first optical fiber 6 through first optical coupling means 33.

The pump wave can be emitted beforehand into a guiding fiber 2 disposed between laser diode 1 and first optical coupling means 33.

More precisely, the pump wave is collimated by first lens 3. It goes through dichroic mirror 5 and is focused on outer end 17 of first optical fiber 6 by second lens 4.

A part of the pump wave is absorbed during the propagation thereof in first optical fiber 6. Doped core 30 of optical fiber 6 through outer end 17 of which the pump wave is coupled is suitable for partially absorbing the pump wave and for leaving a residual pump wave output at inner end 18 of this optical fiber 6.

The double-sheathed structure of first optical fiber 6 enables the pump wave to be guided.

At the output of first optical fiber 6, i.e. at inner end 18 of first optical fiber 6, the residual pump wave and the laser wave are collimated again by first collimation lens 7 to go through partially reflective end 9, which can be a partially reflective mirror. The residual pump wave and the laser wave are then coupled to inner end 19 of the amplifying second optical fiber 10 through second collimation lens 8.

The length of second optical fiber 10 is chosen to absorb a great part of the pump wave incident on inner end 19 thereof.

Very strongly-reflective end 12 of the laser cavity of triggered optical resonator 22 sends back toward first optical fiber 6 all or part of the radiation emitted by the latter. Very strongly-reflective end 12 can be a mirror.

Dichroic mirror 5 is preferentially fully reflective at the laser wavelength and transparent at the pump wave wavelength.

The pump wavelength is chosen from the wavelengths absorbed by optical fibers 6 and 10.

Second lens 4, first collimation lens 7 and second collimation lens 8 are chosen to have a numerical aperture at least as large as that of pumping sheaths 31 of optical fibers 6 and 10.

When the pump wave produced by laser diode 1 is absorbed into optical fibers 6 and 10, it creates a population inversion.

If very strongly reflective end 12 and partially reflective end 9 are correctly disposed, a laser effect is produced in the resonant cavity so formed.

The residual pump wave is partially transmitted by partially reflective end 9 and is injected into second optical fiber 10 through second collimation lens 8.

Partially-reflective end 9 and second collimation lens 8 are chosen so as to couple simultaneously the mode emerging from core 30 of first optical fiber 6 into core 30 of second optical fiber 10 as well as the laser radiation emerging from pumping sheath 31 of first optical fiber 6 toward pumping sheath 31 of second optical fiber 10, ensuring a matching for both the dimensions and the numerical apertures.

The laser wave is then amplified by second optical fiber 10 which is itself pumped by the residual pump wave that has not been absorbed in first optical fiber 6.

The pump wave is very partially absorbed in first optical fiber 6 (5 to 50%, and advantageously less than 20%). The rest is absorbed in second optical fiber 10 so that the pump wave is fully or quasi-fully absorbed.

The typical value of pump wave absorption by core 30 has to be smaller than 30 dB/m, said value taking into account the ratio between core 30 and sheath 31 surfaces.

Likewise, the local concentration of rare earth ions in core 30 has to be the most uniform possible.

The length of fibers 6 and 10 is chosen so as to provide a quasi-complete absorption of the pump wave and to enable the production of high-power short pulses with a duration of the order of the nanosecond or of a few nanoseconds (<10 ns).

Second optical fiber 10 has a length greater than that of first optical fiber 6. This length is adapted so that second optical fiber 10 absorbs a greater part of the pump wave than the first optical fiber 6.

The fiber laser device enables low absorptions to be maintained in first optical fiber 6, while nevertheless transferring the maximal pump power thanks to the amplifying second optical fiber 10 that absorbs all the pump power not absorbed by first optical fiber 6.

Thus, first optical fiber 6 can have a length smaller than that of second optical fiber 10 and has to enable the production of short pulses. These pulses are amplified in second optical fiber 10. Second optical fiber 10 has no longer length constraint because it is integrated into triggered optical resonator 22, so that it can have a low linear absorption, and thus be exempt from problem of evolution in time. Production of short pulses, high efficiency (laser power/pump power) and longevity of fibers are thus all preserved. The pump wave absorption is well distributed between the two optical fibers 6 and 10, which avoid thermal effects and ageing of the fibers.

The total length of optical fibers 6 and 10 abutted together is between 50 cm and 5 m.

Thus, it can be seen that whatever the length of first optical fiber 6 is, the whole pump power can be absorbed by the assembly of optical fibers 6 and 10. To that end, it is enough to choose the combined lengths thereof to be greater than an absorption length.

The length of first optical fiber 6 is preferentially between 3 cm and 30 cm.

It has a core 30 with a large diameter between 10 and 100 micrometers. On the one hand, excited ions are thus not many (low absorption), and on the other hand, they are distributed within a large volume (wide core). Thus, the density thereof is relatively low. The gain in this short fiber is lower than that usually used in pulsed lasers. The relatively lower gain is compensated for by a short optical-length triggered optical resonator 22. Short pulses are then produced.

As aforementioned, the pump power not absorbed by first optical fiber 6 is refocused by first collimation lens 7 and second collimation lens 8 toward second optical fiber 10.

The characteristics of first collimation lens 7 and second collimation lens 8 are calculated so as to image, on the one hand, any ray emerging from confining sheath 31 of first optical fiber 6 toward confining sheath 31 of second optical fiber 10 while respecting the respective numerical apertures, and on the other hand, the natural propagation modes emerging from core 30 of first optical fiber 6 toward the natural propagation modes of core 30 of second optical fiber 10 with minimal loss.

The doping ratio of core 30 of optical fibers 6 and 10 is calculated so as to avoid any problem of evolution of the fibers in time, even under a strong pumping flow.

Figure 3:
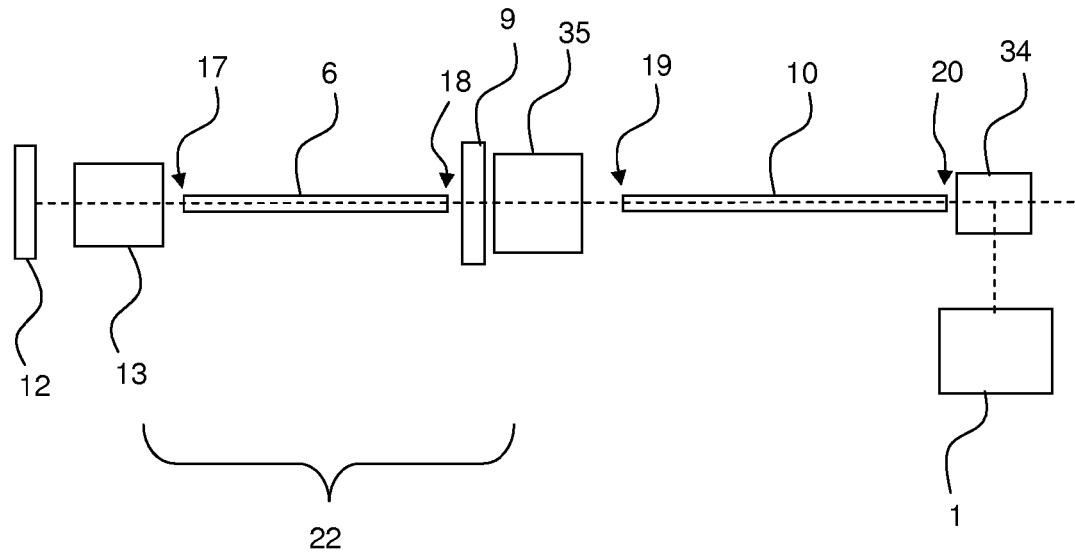
FIG. 3 shows an embodiment of the fiber laser device with a laser diode injecting a pump wave into the amplification area of the laser device.

Other embodiments are possible, as shown in FIG. 3.

The pump wave can be injected by laser diode 1 on outer end 20 of second optical fiber 10 through first optical coupling means 34 which have the same characteristics as in the preceding example.

The pump wave is then partially absorbed by second optical fiber 10, generating a residual pump wave going out through inner end 19 of the latter. The residual pump wave is then coupled to inner end 18 of first optical fiber 6 through second optical coupling means 35.

In that example, optical modulator 13, very strongly reflective end 12 and first optical coupling means 34 are aligned with the two optical fibers 6 and 10. Optical modulator 13 is placed opposite to outer end 17 of first optical fiber 6 and between the latter and very strongly reflective end 12.

The laser pulses go out from the laser device through first optical coupling means 34.

Figure 4:
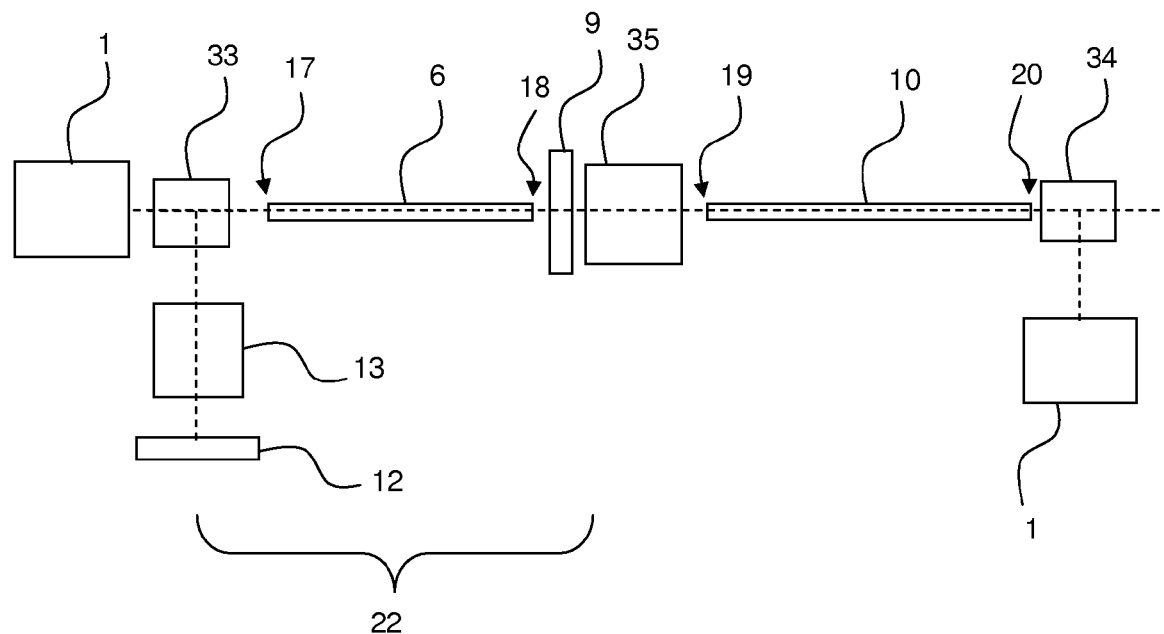
FIG. 4 shows an embodiment of the fiber laser device comprising two laser diodes.

FIG. 4 shows another possible embodiment in which the laser device comprises two first optical coupling means 33, 34 and two laser diodes 1 each emitting a pump wave.

One of the first optical coupling means 33 is suitable for coupling one of the pump waves to outer end 17 of first optical fiber 6 and the other of the first optical coupling means 34 is suitable for coupling the other pump wave to outer end 20 of second optical fiber 10.

The laser pulses go out from the laser device through first optical coupling means 34 disposed opposite to outer end 20 of second optical fiber 10.

Figure 5:
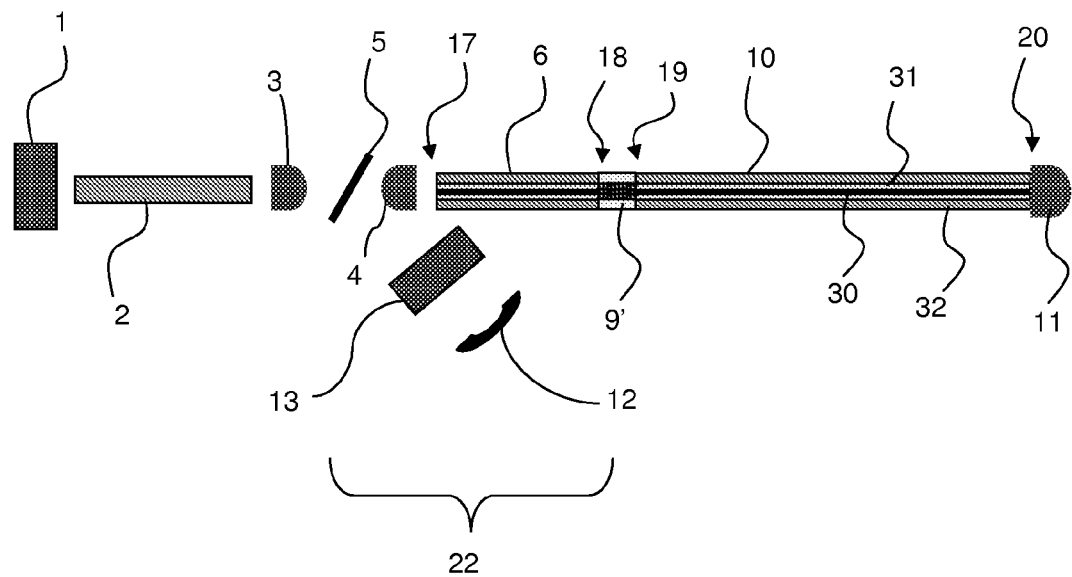
FIG. 5 shows another possible embodiment in which the laser device is partially integrated.
Figure 7:
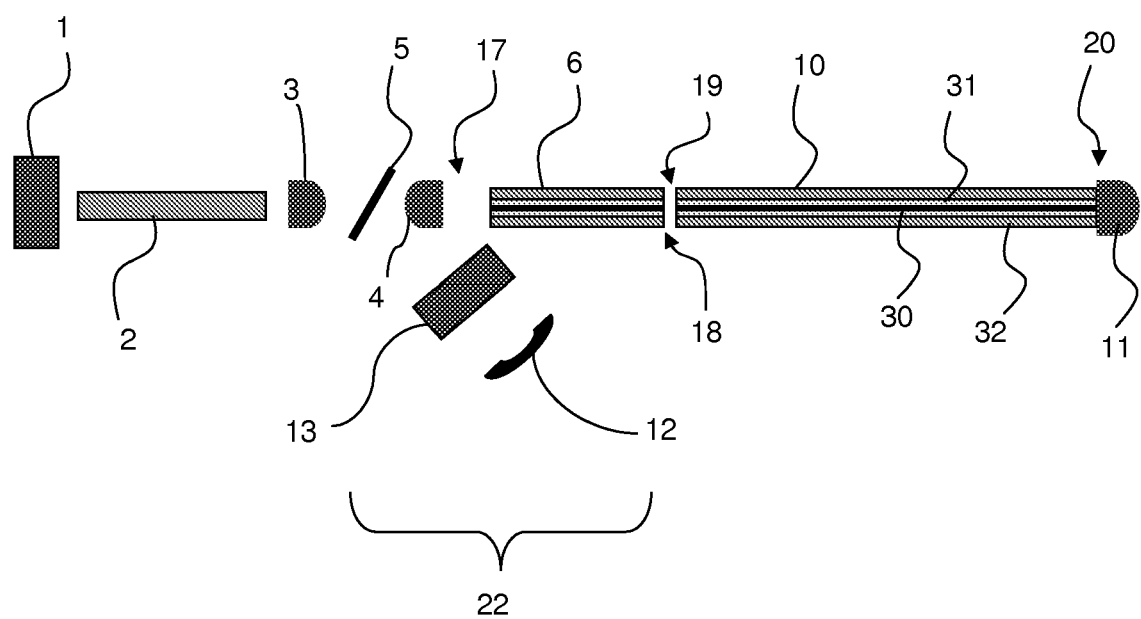
FIG. 7 shows another possible embodiment in which the optical fibers are separated by a thin layer of air.

FIGS. 5 and 7 show two other possible embodiments in which the laser device is partially integrated.

In FIG. 5, inner ends 18, 19 of first 6 and second 10 optical fibers, partially reflective end 9 and second optical coupling means 35 are assembled together so as to form a monolithic assembly, i.e. formed in a single block.

In a particular embodiment shown in FIG. 7, second optical coupling means 35 can be mechanical optical-fiber-end fastening means suitable for bringing closer the opposite inner ends 18, 19 of the two optical fibers 6, 10. Optical fibers 6 and can be brought closer to a distance smaller than 100 micrometers. Only a thin air plate or a low index material (with a thickness smaller than 100 μm) is so found between inner ends 18, 19 of the two optical fibers 6, 10. Ends 18 and 19 of the two optical fibers 6, 10 are kept aligned through the abovementioned mechanical means.

Partially-reflective end 9 can be made of at least one of the two inner ends 18, 19 of optical fibers 6, 10. Inner ends 18, 19 are possibly covered by an optical treatment partially reflective for the laser wave.

It is particularly advantageous for reliability and fabrication cost reasons to be able to integrate the maximum of function into the optical fibers 6 or 10.

Partially-reflective end 9 can be a Bragg reflector 9' comprising a Bragg grating the reflexion coefficient of which is typically between 10 and 50% at the laser pulse wavelength.

This Bragg reflector 9' is engraved into core 30 of optical fiber 6 or 10. Waveguide continuity is provided for the pump wave as well as for the laser pulses.

Optical fibers 6 and 10 and Bragg reflector 9' can be welded together to form the monolithic assembly.

According to another embodiment, first 6 and second 10 optical fibers are made of a single optical fiber 6, 10 in which Bragg reflector 9' is etched or photo-engraved, defining two areas 6 and 10, where the shorter is equivalent to first optical fiber 6 and the longer is equivalent to second optical fiber 10.

Figure 6:
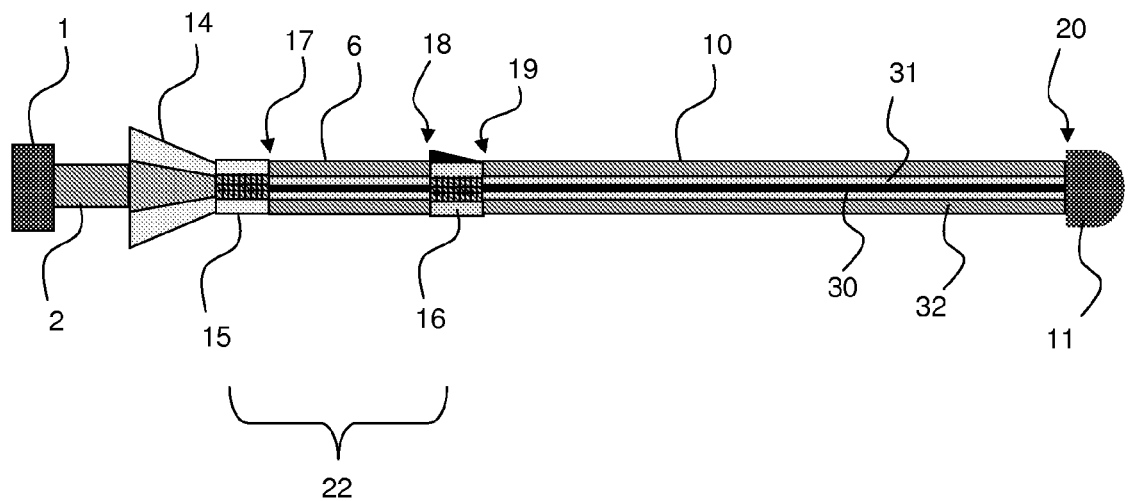
FIG. 6 shows another possible embodiment in which the laser device is fully integrated.

According to another embodiment shown in FIG. 6, partially reflective end 9 and optical modulator 13 are combined together to form an integrated modulator 16 in optical fibers 6 and 10. A fully-integrated monolithic laser device is so obtained.

Integrated modulator 16 can comprise a Bragg grating and an electrical control so as to control the reflectivity thereof. This reflectivity can be changed by an external signal.

Integrated modulator 16 is disposed between first 6 and second 10 optical fibers.

Integrated modulator 16 guides the pump wave from a fiber to the other.

In this configuration, the pump wave is coupled in first optical fiber 6 through a coupling optics 14 or a "taper".

Coupling optics 14 adapts adiabatically the diameter of guiding fiber 2 carrying the pump wave emitted by laser diode 1 toward the diameter of the first optical fiber 6 pumping sheath 31.

Very strongly-reflective end 12 and first optical coupling means 33 can be combined together to form a total reflector 15 integrated at outer end 17 of first optical fiber 6.

Total reflector 15 formed by a Bragg grating engraved into first optical fiber 6 forms the bottom mirror of the resonating cavity and transmits the pump wave.

The set of the laser device optical elements 2, 14, 15, 6, 16 and 10 is assembled so as to form a monolithic system. These elements can be welded.

Several laser diodes 1 can be coupled together in the fiber through a "tapers octopuses" system.

Integrated modulator 16 can be positioned between outer end 17 of first optical fiber 6 and coupling optics 14.

The laser device can comprise a polarizing means and a stabilizing means to stiffen optical fibers 6, 10 so as to obtain polarized laser pulses. Modulator 13 can be this polarizing means.

Optical fibers 6, 10 can be stiffened either intrinsically through using of "rod-type fibers" or through mechanical means external to the fiber (mechanical support or sheath for example). These mechanical means can be either linear or have a regular form compatible with an optical fiber holding (circle, spiral, curve portion . . . ).

It is thus obtained a high-power fiber laser device having a high efficiency, a short pulse-duration of the order of the nanosecond, a great optical fiber longevity, that is of simple design and that can be in a partially or fully integrated form.

The invention claimed is:

1. A high-power fiber optic pulsed laser device comprising:
   at least one laser diode (1) suitable for emitting a pump wave,
   a triggered optical resonator (22) suitable for generating a laser wave, comprising:
   a reflective end (12) and a partially reflective end (9) suitable for partially transmitting the pump wave and the laser wave outside of the triggered optical resonator (22),
   an amplifying medium consisting of a first optical fiber (6) suitable for absorbing the pump wave and for amplifying the laser wave, disposed between the two reflective ends (9) and (12),
   an optical modulator (13) suitable for switching from an off-state to a on-state,
   an optical amplifier consisting of a second optical fiber (10), disposed such that the partially reflective end (9) of the triggered optical resonator (22) is located between the two optical fibers (6, 10), said first (6) and second (10) optical fibers being of the double-sheathed optical fiber type with a core (30), a pumping sheath (31) and a confining sheath (32), and having each an inner end (18, 19) and an outer end (17, 20),
   first optical coupling means (33, 34) suitable for coupling said pump wave to one of the two optical fibers (6, 10) through the outer end (17, 20) thereof,
   second optical coupling means (35) disposed between the two optical fibers (6, 10),
   wherein,
   the optical modulator (13) is an acousto-optic or an electro-optic modulator,
   a doped core (30) of the optical fiber (6, 10) through the outer end (17, 20) of which said pump wave is coupled is suitable for partially absorbing the pump wave and for leaving a residual pump wave at the inner end (18, 19) of said optical fiber (6, 10),
   the second optical coupling means (35) are suitable for providing simultaneously the coupling of the residual pump wave and the coupling of the laser wave emerging from the triggered optical resonator (22), at the inner end (18, 19) of the other of the two optical fibers (6, 10),
   said second optical fiber (10) has a length greater than that of the first optical fiber (6), which makes it suitable for amplifying the laser wave emerging from the triggered optical resonator (22).

2. The high-power fiber optic pulsed laser device according to claim 1, wherein the inner ends (18, 19) of the first (6) and second (10) optical fibers, the partially reflective end (9) and the second optical coupling means (35) are assembled together so as to form a monolithic assembly.

3. The high-power fiber optic pulsed laser device according to claim 1, wherein the first (6) and second (10) optical fibers are made of a single optical fiber in which the partially reflective end (9) and the second optical coupling means (35) are etched or photoengraved, forming two separate optical fiber parts (6, 10) with different lengths.

4. The high-power fiber optic pulsed laser device according to claim 2, wherein the partially reflective end (9) and the optical modulator (13) form a integrated modulator (16) in the optical fibers (6, 10), comprising an electrical control so as to control the reflectivity of said modulator, said integrated modulator (16) being disposed between the first (6) and second (10) optical fibers.

5. The high-power fiber optic pulsed laser device according to claim 1, wherein the partially reflective end (9) comprises a Bragg grating.

6. The high-power fiber optic pulsed laser device according to claim 5, wherein the very strongly reflective end (21) and the first optical coupling means (33, 34) form a total reflector (15) integrated to the outer end (17) of the first optical fiber (6), said total reflector (15) comprising a Bragg grating.

7. The high-power fiber optic pulsed laser device according to claim 1, wherein the second optical coupling means (35) are mechanical optical-fiber-end fastening means suitable for bringing closer the opposite inner ends (18, 19) of the two optical fibers (6, 10).

8. The high-power fiber optic pulsed laser device according to claim 1, further comprising:
   two laser diodes (1) each emitting a pump wave, and
   two first optical coupling means (33, 34), one of the first optical coupling means (33) being suitable for coupling one of the pump waves to the outer end (17) of the first optical fiber (6) and the other of the first optical coupling means (34) being suitable for coupling the other pump wave to the outer end (20) of the second optical fiber (10).

9. The high-power fiber optic pulsed laser device according to claim 1, wherein at least one of the two optical fibers (6, 10) is of the photonic fiber type.

10. The high-power fiber optic pulsed laser device according to claim 1, wherein the cores (30) of the first (6) and second (10) optical fibers have a diameter larger than 30 μm.

11. The high-power fiber optic pulsed laser device according to claim 1 wherein it comprises a polarizing means and a stabilizing means to stiffen the optical fibers (6, 10) so as to obtain polarized laser pulses.

* * * * *